United States Patent
Uebe et al.

(10) Patent No.: US 8,318,041 B2
(45) Date of Patent: Nov. 27, 2012

(54) STABLE SEDIMENT DISPERSION, METHOD FOR PRODUCTION AND USE THEREOF

(75) Inventors: Jochen Uebe, Wurzburg (DE); Erich Seider, Sulzbach (DE); Silvia Gaul, Stetten (DE); Holger Bose, Wurzburg (DE)

(73) Assignee: Fraunhofer-Gesellschaft zur Forderung der Angewandten Forschung e.V., Munich (DE)

( * ) Notice: Subject to any disclaimer, the term of this patent is extended or adjusted under 35 U.S.C. 154(b) by 770 days.

(21) Appl. No.: 12/298,033

(22) PCT Filed: Apr. 20, 2007

(86) PCT No.: PCT/EP2007/003489
§ 371 (c)(1),
(2), (4) Date: Jan. 21, 2009

(87) PCT Pub. No.: WO2007/121942
PCT Pub. Date: Nov. 1, 2007

(65) Prior Publication Data
US 2009/0250652 A1    Oct. 8, 2009

(30) Foreign Application Priority Data

Apr. 21, 2006 (DE) .......... 10 2006 018 530

(51) Int. Cl.
*C09K 5/00* (2006.01)

(52) U.S. Cl. ............... 252/73; 252/570; 252/571

(58) Field of Classification Search ............ None
See application file for complete search history.

(56) References Cited

U.S. PATENT DOCUMENTS

| 4,840,989 A | 6/1989 | Ohst et al. |
| 5,948,852 A * | 9/1999 | Wendt et al. ............ 524/731 |
| 6,251,989 B1 | 6/2001 | Edelmann et al. |
| 6,299,659 B1 * | 10/2001 | Kido et al. ............... 51/309 |

FOREIGN PATENT DOCUMENTS

| DE | 3709852 A1 | 10/1988 |
| DE | 4234846 A1 | 4/1994 |
| DE | 19632430 C1 | 2/1998 |
| DE | 19823390 A1 | 12/1999 |
| DE | 10310588 B3 | 9/2004 |
| EP | 0276658 A2 | 8/1988 |
| EP | 0284268 B1 | 9/1988 |
| EP | 0457597 A1 | 11/1991 |
| EP | 0521638 A1 | 1/1993 |
| EP | 0523300 B1 | 1/1993 |
| EP | 0824128 B1 | 2/1998 |
| JP | 06-032904 | 2/1994 |
| WO | WO 93/06199 A1 | 4/1993 |

OTHER PUBLICATIONS

Material Safety Data Sheet No. TSI 5201-01-00 for TX-ER8, Nippon Shokubai Co., Ltd., prepared Nov. 30, 1999 (4 pgs.).

* cited by examiner

*Primary Examiner* — Necholus Ogden, Jr.
(74) *Attorney, Agent, or Firm* — Leydig, Voit & Mayer, Ltd.

(57) ABSTRACT

The present invention relates to a stable sediment dispersion which can be used above all as electrorheological (ERF) and/or magnetorheological fluid (MRF), a method for production thereof and also use thereof.

33 Claims, No Drawings

STABLE SEDIMENT DISPERSION, METHOD FOR PRODUCTION AND USE THEREOF

This application is a U.S. National Phase of International Patent Application No. PCT/EP2007/003489, filed Apr. 20, 2007, which claims priority to German Patent Application No. 10 2006 018 530.7, filed Apr. 21, 2006, both of which are hereby incorporated by reference.

The present invention relates to a stable sediment dispersion which can be used above all as electrorheological (ERF) and/or magnetorheological fluid (MRF), a method for production thereof and also use thereof.

ERF and also MRF are fluids which change their flow behaviour under the effect of an external electrical or magnetic field. ERF and MRF generally concern non-colloidal dispersions comprising particles which are polarisable in an electrical or magnetic field in a carrier fluid which contains possibly additives. Stabilisers can be used as such additives in order to avoid or minimise sedimentation of the non-colloidal particles of the dispersion.

According to the density difference between the particles and the carrier fluid, the result with previous ERF and/or MRF is sedimentation of the particles. A sediment is formed which can have high compaction. In the case of high compaction, redispersion of the particles can be made very difficult. Severe sedimentation and a compact sediment for example can greatly reduce the service life of an ERF and/or MRF. In practical use, the disperse phase should as far as possible not sediment but be able to be redispersed well in any event.

There are used preferably as stabilisers for ERF which correspond to the state of the art, reaction products of OH-functional polydimethoxysiloxanes with aminopropyltriethoxysilane and/or the conversion product of octamethylcyclotetrasiloxane with N-(β-aminoethyl)-γ-aminopropylmethyldiethoxysilane (EP 0 824 128 B1). This thereby involves reactive stabilisers which have amino groups as functional groups which enable chemical crosslinking with the surface of the prepolymer. The structure is described in EP 0 824 128 B1.

The particle size and the particle size distribution affect the sedimentation stability of dispersions. The average particle diameter of the dispersed prepolymer is set at a value between 0.1 and 30 μm, preferably between 0.5 and 25 μm and particularly preferred between 1 and 20 μm. The relative width of the particle size distribution U90 is set preferably at a value of 1.7. The amount of the particle size distribution U90 is calculated according to the following formula, $$U_{90} = \frac{d_{90} - d_{10}}{d_{50}}$$

$d_{90}$, $d_{50}$ and $d_{10}$ having the following meaning:

$d_{90}$ [μm]: 90% of the total number of all the particles have a particle size which is smaller than or equal to this value.

$d_{50}$ [μm]: 50% of the total number of all the particles have a particle size which is smaller than or equal to this value.

$d_{10}$ [μm]: 10% of the total number of all the particles have a particle size which is smaller than or equal to this value.

In order to avoid sedimentation, the non-aqueous carrier fluid should in addition preferably have a density which corresponds approximately to the density of the hardened emulsified particles. Thus dispersions can be produced for example by using halogen-containing carrier fluids, said dispersions having no sedimentation even over weeks despite low basic viscosities. In particular for the production of stable sediment dispersions, carrier fluids of the general structure corresponding to EP 0 824 128 B1 [0019] are suitable. However, the viscosity of the present commercially available fluorine-containing siloxanes increases greatly with the polymerisation degree of the fluorine-containing monomer.

As an alternative possibility for the preparation of stable sediment ERF, a suspension comprising lithium resorcinol formaldehyde resin particles which are suspended in fluorosilicone oil is described in EP 0 284 268 B1. In order to compensate for the density difference of the particles and of the carrier fluid, polychlorotrifluoroethylene (CTFE) is added. This ERF however contains volatile components, in particular polychlorotrifluoroethylene (CTFE) so that in time the basic viscosity of the ERF increases and the particles sediment ever more severely.

Furthermore, in EP 0 523 300 B1 and also in the Material Safety Data Sheet No. TSI 5201-01-00, the preparation of an ERF, comprising sulphonated polystyrene-co-divinyl benzene sodium salt particles which are suspended in silicone oil, is described. In order to compensate for the density difference of the particles and of the carrier fluid, polychlorotrifluoroethylene (CTFE) is added. This ERF however contains volatile components, in particular polychlorotrifluoroethylene (CTFE) so that in time the basic viscosity of the ERF increases and the particles sediment ever more severely.

It is the object of the present invention, despite a great density difference between a homogeneous phase used and dispersed particles, to ensure the production of a stable sediment dispersion which is in particular a suspension and/or emulsion, especially an electrorheological and/or magnetorheological fluid, by means of a suitable stabiliser.

This object is achieved by the dispersion having the features of patent claim 1. Likewise a method according to the invention for the production of such a dispersion is provided in patent claim 21. Advantageous developments are described respectively in the dependent claims. Furthermore, patent claims 25 to 28 indicate possibilities for use of dispersions produced in this way.

According to the invention, a stable sediment dispersion is provided, containing a) at least one carrier fluid which is preferably electrically non-conductive, b) at least one sort of particles and/or droplets dispersed therein which form the dispersed phase, and also c) at least one stabiliser, the at least one stabiliser being at least partially fluorinated.

The dispersions according to the invention, preferably suspensions and/or emulsions, especially electrorheological and/or magnetorheological fluids, are distinguished in that they contain an at least partially fluorinated stabiliser. It was shown surprisingly that the introduction of fluorinated side chains in the stabiliser causes a stronger hydrophobic effect of the stabiliser. It thereby emerged herefrom that, for example with low viscous silicone oils with a viscosity of less than 10 cSt, despite a large density difference from for example dispersed salt-doped PUR particles, only low sedimentation occurs.

Instead, when at rest, a looser structure is formed between silicone oil and particles which has only a small proportion of supernatant clear oil. In addition, this structure can be redispersed very easily with the supernatant silicone oil. In the case of systems as are known from the state of the art, once the particles are sedimented, a hard sediment is formed which can scarcely be redispersed any more. The basic viscosity of the ERF comprising salt-doped PUR particles and also the above-described stabiliser and silicone oils of low viscosity as carrier fluid is almost unchanged at high shear rates relative to EP 0 824 128 B1. The dispersion according to the invention, for example comprising salt-doped PUR particles, stabiliser and silicone oil as carrier fluid, has therefore a property profile which is significantly improved compared with previous ERF.

An advantageous embodiment provides that the stabiliser is a reactive stabiliser. Reactive stabilisers preferably have functional groups which enable chemical crosslinking with the surface of the particle to be stabilised, in particular of a prepolymer and/or polymer. The type of functional groups is thereby guided by the curing reaction. In particular, the functional groups are thereby selected from the group comprising amino, alcohol, carbonyl, aldehyde, hemiacetal, acetal, epoxide, carboxylic acid, carboxylic acid chloride, carboxylic acid anhydride, carboxylic acid amide, imidazolyl, vinyl, ethinyl, halogen, α,β-unsaturated keto, (meth)acryl and/or thiol groups or groups derived therefrom.

The stabiliser can thereby be crosslinked directly or indirectly with the prepolymer. According to the invention, there is understood by direct crosslinking, a direct chemical bonding between the surface of the prepolymer and/or polymer and of the stabiliser. Indirect crosslinking represents according to the invention an indirect bonding between the surface of the prepolymer and the stabiliser, in which in addition at least one further molecule is also bonded between the surface of the prepolymer and the stabiliser. Preferably, an organic isocyanate is thereby used according to the invention.

In particular, the stabiliser is an at least partially fluorinated organofunctional polysiloxane of the general formula I,

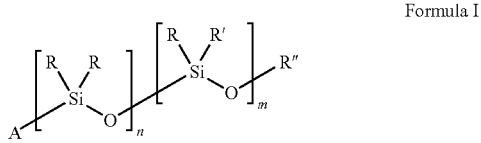

Formula I with n and m independently of each other from 0 to 77,
R=$C_1$-$C_{18}$ alkyl and/or phenyl, preferably methyl,
R'=$(CH_2)_o$—$C_pF_{2p+1}$ with o=2-18 and p=1-10,
R"=$C_1$-$C_{18}$ alkyl and/or phenyl and/or H,
A=the same or different SiC-bonded radicals selected from the group comprising

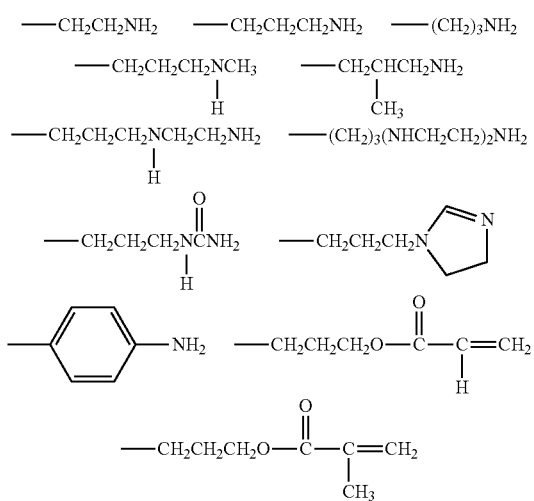

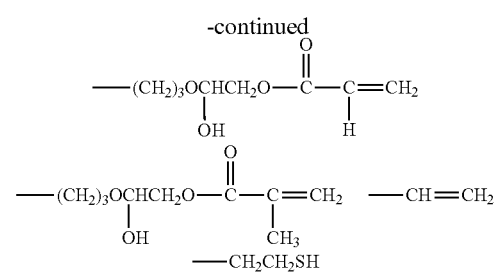

and/or radicals with a terminal OH group, a vinyl or ethinyl group, a halogen group, an aldehyde, hemiacetal or acetal group, an epoxide group or diphenyl ketone group. Of the mentioned radicals, the N-aminoethyl-3-aminopropyl radical is very particularly preferred.

There has proved to be particularly suitable for the use as stabiliser according to the invention, the reaction product of hexaphenylcyclotrisiloxane, (tridecafluoro-1,1,2,2-tetrahydrooctyl)methylcyclotrisiloxane and N-(2-aminoethyl)-3-aminopropylmethyldimethoxysilane or the reaction product of octamethylcyclotetrasiloxane and (3,3,3-trifluoropropyl)methylcyclotrisiloxane with N-(β-aminoethyl)γ-aminopropylmethyldimethoxysilane.

Preferably, the average molecular weights of the organofunctional siloxanes of formula I are at least 1,400 g/mol.

Preferably, the electrically non-conductive carrier fluid has a viscosity between 0.1 mPas and 1,000 mPas, preferably between 1 mPas and 100 mPas.

It is thereby advantageous in particular if the dispersed phase is formed from polymer particles and/or polymer droplets. There are understood by polymers according to the invention likewise co- and/or terpolymers. However, it is also possible to use other particles or droplets as polymer particles and/or droplets. There are possible for example for this purpose materials, such as metals, ceramics, or particles made of iron, cobalt or nickel. It is likewise achieved by the stabiliser that a stable Q sediment dispersion which can be easily redispersed is also possible with particles of this kind.

Furthermore, it has also proved to be useful if at least one compound is thereby used as polymer, which compound has at least one hydroxy, amino, (meth)acrylate, methacrylamide and/or vinyl group.

Polyurethane particles should be preferred very particularly as prepolymer- and/or polymer particles.

The particle size of the polymer particles is in a range of 0.1 to 30 μm, preferably in a range of 0.5 to 25 μm, very particularly preferred in a range of 1 to 20 μm.

Any arbitrary non-conductive fluid can likewise be used as carrier fluid for the electrorheological fluid. According to the purpose of use of the ERF, the carrier fluid can be selected according to the basic viscosity thereof. Hence e.g. silicone oils (e.g. polydimethylsiloxanes or polyphenylmethylsiloxanes), mineral oils, hydrocarbons (e.g. paraffin, decane or dodecane) and/or organic esters (e.g. dibutyl sebacate) or also mixtures hereof are conceivable.

The usable electrically polarising and/or magnetisable component can in principle be any known compound which can be used for electrorheological and/or magnetorheological fluids, but also a mixture hereof. Thus e.g. organic, inorganic semiconductors and/or ion conductors are used. This variant makes possible stable sediment ERF.

The content of the at least one sort of electrically polarising and/or magnetisable components with respect to the total weight of the dispersed phase can thereby vary over a wide range, according to which properties of the ERF or MRF are desired. Hence specific adjustment of properties is provided.

Preferably, the content of the disperse phase is between 1 to 80% by volume, preferably between 10 and 50% by volume, relative to the total dispersion.

The proportion of the at least one carrier fluid relative to the total dispersion is advantageously between 99 and 20% by volume, preferably between 90 and 50% by volume, particularly preferred between 75 and 50% by volume.

The weight component of the at least one stabiliser relative to the dispersed phase is advantageously between 0.01 and 10% by weight, preferably between 0.1 and 5% by weight, particularly preferred between 0.2 and 3% by weight.

Likewise additives can be contained in the dispersions according to the invention. These additives can be functional and open up a wide field of application of the dispersions. For example, additives can be contained selected from the group comprising metal salts; plasticisers; antioxidants; pigments; particles made of ceramic, metals or alloys, metal oxides, thixotropic agents, such as e.g. pyrogenic silicic acids and/or mixtures hereof. The preferred content can thereby vary over a wide range according to which properties are required.

In particular, the dispersion is a suspension and/or emulsion, very particularly an electrorheological and/or magnetorheological fluid.

According to the invention, a method is likewise provided for producing a dispersion, in which a) at least one fluid prepolymer and/or polymer is dispersed in at least one carrier fluid and/or
b) at least one sort of particles is dispersed in at least one carrier fluid and
c) at least one stabiliser is added.

The addition of the stabiliser can thereby be effected simultaneously and/or subsequently to steps a) and b) but it is also possible that the stabiliser is introduced in advance.

The dispersion of the liquid polymer and/or prepolymer can be effected for example by vigorous agitation or other mechanical impingement, fine droplets being formed. As an alternative thereto, the particle formation can also be effected in advance so that already finished particles are distributed in the fluid phase. The particles can thereby be fluid and/or solid.

Preferably, the dispersion is implemented at a pressure between 1 and 100 bar, preferably between 5 and 80 bar, particularly preferred between 10 and 70 bar.

It is likewise advantageous if the dispersion is implemented at a temperature between 10 and 200° C., preferably between 20 and 100° C., particularly preferred between 30 and 75° C.

The homogenisation is thereby effected over a preferred period of time between 1 min and 12 hours, preferably between 1 hour and 5 hours.

In order to produce in particular ERF based on polymers and/or prepolymers, it is thereby required that, before dispersion into the at least one prepolymer, at least one sort of electrically polarising components is mixed in.

In order to obtain hardened polymer particles, the prepolymer, in particular a polyurethane prepolymer, is hardened preferably by addition of at least one hardener to form the corresponding polymer. There are used thereby in particular, TDI (toluene diisocyanate), MDI (methylene diisocyanate) and/or HDI (hexamethylene diisocyanate). The at least one hardener can thereby be used stoichiometrically but also substoichiometrically or superstoichiometrically relative to the prepolymer which is used.

The electro- and/or magnetorheological fluids which can be prepared according to the invention are used in adaptive shock and oscillation dampers, controllable brakes, couplings and also in sports or training apparatus.

Furthermore, the electro- and/or magnetorheological fluids which can be prepared according to the invention can be used in order to produce and/or display haptic information, such as forces, torques, characters, computer-simulated objects, sensor signals or pictures.

Finally, the electro- and/or magnetorheological fluids which can be prepared according to the invention can be used for the simulation of viscous, elastic and/or viscoelastic properties or consistency distribution of an object, in particular for training and/or research purposes and/or for medical applications.

The invention is explained in more detail with reference to the subsequent example without restricting the invention to the mentioned substances or parameters.

EXAMPLE

In a flask, there were homogenised with an agitator respectively 40 g of a trifunctional polyethyleneglycol with the addition of a mixture comprising 50 g silicone oil (polydimethylsiloxane with a viscosity at 25° C. of 5 mm$^2$/s and a density at 25° C. of 0.93 g/cm$^3$) and 1 g of the stabiliser (conversion product of 73 parts hexaphenylcyclotrisiloxane, 2 parts (tridecafluoro-1,1,2,2-tetrahydrooctyl)methylcyclotrisiloxane and 1 part N-(2-aminoethyl)-3-aminopropylmethyldimethoxysilane. Subsequently, 12 g toluene diisocyanate were metered into the emulsion.

When comparing the sedimentation and redispersion properties of a dispersion produced in this way with an analogously produced dispersion with a stabiliser without fluorinated side groups, this dispersion sedimented less. A soft and high sediment formed in contrast to the comparative dispersion, the sediment of which was compact and dense. In addition, this dispersion was able to be homogenised again completely by light shaking. The sediment of the comparative dispersion, in contrast, could only be redispersed by very intensive and long-lasting shaking.

The invention claimed is:

1. Stable sediment dispersion, comprising:
   at least one carrier fluid,
   at least one type of particles and/or droplets dispersed therein which form the dispersed phase, and
   at least one reactive stabiliser,
   wherein the at least one stabiliser is an at least partially fluorinated organofunctional siloxane of the general formula I,

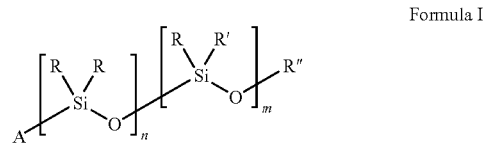

Formula I with n and m independently of each other from 0 to 77,
R=$C_1$-$C_{18}$ alkyl and/or phenyl,
R'=$(CH_2)_o$—$C_pF_{2p+1}$ with o=2-18 and p =1-10,
R"=$C_1$-$C_{18}$ alkyl and/or phenyl and/or H,
A=the same or different SiC-bonded radicals selected from the group comprising

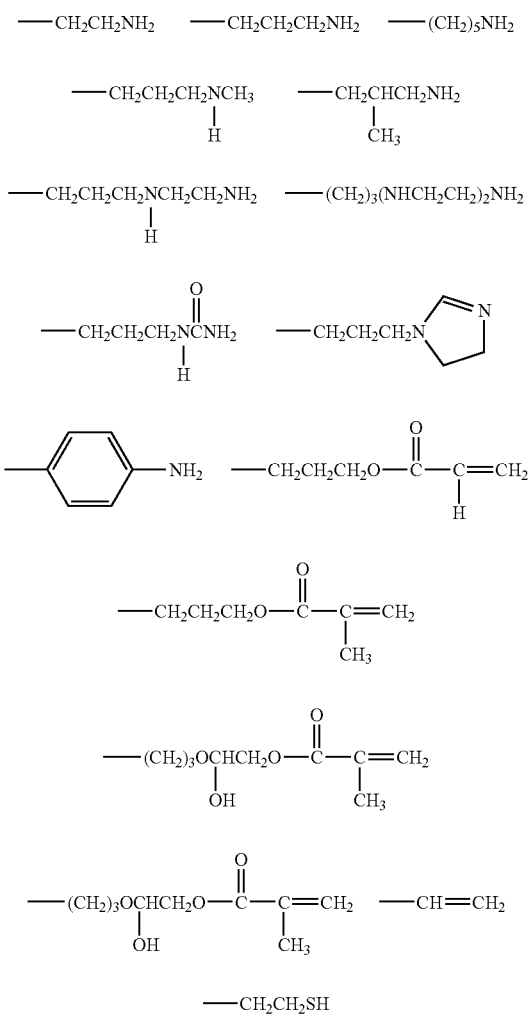

and/or radicals with a terminal OH group, a vinyl or ethinyl group, a halogen group, an aldehyde, hemiacetal or acetal group, an epoxide group or diphenyl ketone group.

2. Dispersion according to claim 1, wherein the reactive stabiliser has at least one functional group which enables chemical crosslinking with a prepolymer and/or polymer, in particular an amino, alcohol, carbonyl, aldehyde, hemiacetal, acetal, epoxide, carboxylic acid, carboxylic acid chloride, carboxylic acid anhydride, carboxylic acid amide, imidazolyl, vinyl, ethinyl, halogen, α, β-unsaturated keto, (meth) acryl and/or thiol group or groups derived therefrom.

3. Dispersion according to claim 1, wherein the at least one reactive stabiliser is the reaction product of hexaphenylcyclotrisiloxane, (tridecafluoro-1,1,2,2-tetrahydrooctyl)methylcyclotrisiloxane and N-(2-aminoethyl)-3-aminopropylmethyldimethoxysilane or the reaction product of octamethylcyclotetrasiloxane and (3,3,3-trifluoropropyl)methylcyclotrisiloxane with N-(β-aminoethyl)γ-aminopropylmethyldimethoxysilane.

4. Dispersion according to claim 1, wherein the at least one reactive stabiliser has an average molecular weight of at least 1,400 g/mol.

5. Dispersion according to claim 1, wherein the carrier fluid is an electrically non-conductive fluid.

6. Dispersion according to claim 1, wherein the carrier fluid is selected from the group consisting of silicone oils, mineral oils, hydrocarbons, organic esters and/or mixtures thereof.

7. Dispersion according to claim 1, wherein the carrier fluid has a viscosity between 0.1 mPas and 1,000 mPas.

8. Dispersion according to claim 1, wherein the dispersed phase is formed from polymer particles and/or polymer droplets.

9. Dispersion according to claim 8, wherein polymer has at least one hydroxy, amino, (meth)acrylate, methacrylamide and/or vinyl group.

10. Dispersion according to claim 1, wherein the dispersed particles have an average particle size between 0.1 and 30 μm.

11. Dispersion according to claim 1, wherein the dispersed particles comprise at least one type of electrically polarising and/or magnetisable components.

12. Dispersion according to claim 11, wherein the electrically polarising components are selected from the group consisting of organic semiconductors, inorganic semiconductors and/or ion conductors, and/or the magnetisable components are selected from the group consisting of Fe, Co, Ni and/or alloys thereof.

13. Dispersion according to claim 1, wherein the dispersed phase makes up between 1 to 80% by volume of the total dispersion.

14. Dispersion according to claim 1, wherein the proportion of the at least one carrier fluid relative to the total dispersion is between 99 and 20% by volume.

15. Dispersion according to claim 1, wherein the weight proportion of the at least one reactive stabiliser relative to the dispersed phase is between 0.01 and 10% by weight.

16. Dispersion according to claim 1, further comprising at least one additive selected from the group consisting of metal salts; plasticisers; antioxidants; pigments; particles made of ceramic, metals or alloys, metal oxides, thixotropic agents, and/or mixtures thereof.

17. Dispersion according to claim 1, wherein the dispersion is a suspension and/or emulsion.

18. Dispersion according to claim 1, wherein it is an electrorheological and/or magnetorheological fluid.

19. Method for producing a dispersion according to claim 1, comprising:
a) dispersing at least one fluid prepolymer and/or polymer in at least one carrier fluid and/or
b) dispersing at least one type of particles in at least one carrier fluid and
c) adding at least one reactive stabiliser.

20. Method according to claim 19, further comprising mixing in at least one type of electrically polarising components before dispersion into the at least one prepolymer.

21. Method according to claim 19, wherein the prepolymer is hardened after dispersion by addition of at least one hardener to form the corresponding polymer.

22. Method according to claim 21, wherein the hardener is selected from the group consisting of TDI (toluene diisocyanate), MDI (methylene diisocyanate) and/or HDI (hexamethylene diisocyanate).

23. An electrorheological and/or magnetorheological fluid comprising the dispersion of claim 1.

24. Dispersion according to claim 1, wherein the carrier fluid has a viscosity between 1 mPas and 100 mPas.

25. Dispersion according to claim 1, wherein the at least one sort of dispersed particles has an average particle size between 0.5 and 25 μm.

26. Dispersion according to claim 1, wherein the at least one sort of dispersed particles has an average particle size between 1 and 20 μm.

27. Dispersion according to claim 1, wherein the dispersed phase makes up between 10 and 50% by volume of the total dispersion.

28. Dispersion according to claim 1, wherein the proportion of the at least one carrier fluid relative to the total dispersion is between 90 and 50% by volume.

29. Dispersion according to claim 1, wherein the proportion of the at least one carrier fluid relative to the total dispersion is between 75 and 50% by volume.

30. Dispersion according to claim 1, wherein the weight proportion of the at least one stabiliser relative to the dispersed phase is between 0.1 and 5% by weight.

31. Dispersion according to claim 1, wherein the weight proportion of the at least one stabiliser relative to the dispersed phase is between 0.2 and 3% by weight.

32. Dispersion according to claim 8, wherein the polymer is a polyurethane.

33. The dispersion of claim 1, wherein R is methyl.

* * * * *